United States Patent [19]

Villata

[11] Patent Number: 4,572,334
[45] Date of Patent: Feb. 25, 1986

[54] HYDRAULICALLY CONTROLLED BRAKE
[75] Inventor: Gino Villata, Buttigliera d'Asti, Italy
[73] Assignee: Valeo, Paris, France
[21] Appl. No.: 608,234
[22] Filed: May 8, 1984
[30] Foreign Application Priority Data
  May 11, 1983 [FR] France ............................... 83 07869
[51] Int. Cl.4 ........................ F16D 55/02; F16D 55/18
[52] U.S. Cl. ..................................... 188/71.6; 92/255;
                                188/72.4; 188/264 G; 403/282
[58] Field of Search ............... 188/71.1, 71.6, 72.1,
       188/72.4, 370, 264 A, 264 AA, 264 G, 217,
       73.1, 24.12; 92/248, 255, 213, 216, 217, 208,
                 212, 224, 258; 123/193 P; 403/282, 280

[56] References Cited
U.S. PATENT DOCUMENTS
3,274,904  9/1966  Jacoby ........................ 188/264 G X
4,419,925 12/1983  Tsuzuki et al. ........................ 92/212

FOREIGN PATENT DOCUMENTS
2854247  6/1980  Fed. Rep. of Germany ... 188/264 G
0680281  1/1965  Italy ................................... 188/72.4
47-21374  6/1972  Japan ................................. 188/72.4
0731222  6/1955  United Kingdom .................. 92/255
0985628  3/1965  United Kingdom ........... 188/264 G Primary Examiner—Bruce H. Stoner, Jr.
Assistant Examiner—Robert J. Oberleitner
Attorney, Agent, or Firm—Young & Thompson

[57] ABSTRACT

A hydraulically controlled brake is equipped with a device preventing an excessive rise in temperature of the hydraulic fluid. The control piston of the brake comprises a cup-shaped piece and also an insulating core accommodated in the cup and having a free end face via which the piston pushes on the friction element. The core is screwed onto a central threaded column projecting from the bottom of the cup.

20 Claims, 4 Drawing Figures

HYDRAULICALLY CONTROLLED BRAKE

BACKGROUND TO THE INVENTION

The present invention relates to a hydraulically controlled brake comprising at least one friction element, for example a pad where a disc brake is concerned, designed to be clamped against a rotating track under the thrust of a piston mounted to slide in a cylinder body, in response to a generation of pressure in a control chamber filled with hydraulic fluid and defined by the piston in the cylinder body.

The invention relates more particularly to such a brake, in which the piston comprises a cup-shaped piece which has a cylindrical side wall engaged in the cylinder body and a bottom adjacent to the control chamber.

The invention relates even more particularly to such a brake, in which means are provided to prevent an excessive rise in temperature of the hydraulic fluid and consist of a cylindrical core which is made of mechanically resistant and thermally insulating material and which is engaged in the cup.

In general, the means for fitting the core into the cup make use of an effect which involves engaging the core into the cup by force, thus increasing the production cost.

The subject of the present invention is a hydraulically controlled brake of the type mentioned above, in which the construction of the piston is particularly simple and convenient, at the same time with a reduced cost price and excellent effectiveness against the risks of excessive heat of the hydraulic fluid.

SUMMARY

According to the invention, a hydraulically controlled brake of the type mentioned above is characterised in that the cylindrical core made of mechanically resistant and thermally insulating material is fixed to the cup by screwing the core to a central threaded column projecting from the bottom of the cup. The core preferably possesses a central hole to allow it to be screwed to the central threaded column.

By means of this arrangement, the core is fixed to the cup easily, very strongly, and cheaply.

The thermally insulating and mechanically resistant material of which the core is made consists advantageously of a brake friction lining material comprising fibres, such a glass or asbestos fibres, fillers, such as calcium carbonate, and a binder, for example phenolic resin, these various constituents first being mixed and then pelletised and subjected to baking. A remarkable result of the fact that the core is provided, according to the invention, with a central hole to ensure that it is fitted in the cup is that the gas occluded in the material of the core is allowed to expand freely during baking, thus avoiding the risk of warping.

The central hole of the core is preferably smooth, and this hole is screwed to the threaded column of the cup as a result of an effect of tapping the said hole in situ. The result of this arrangement is that it allows the core to be pelletised particularly easily. Moreover, the core and the cup are fixed to one another extremely effectively.

According to another characteristic, an annular gap is provided between the cylindrical side walls of the core and the cup. The result of this design is that it allows excellent thermal insulation between, on the one hand, the friction zone of the brake and, on the other hand, the hydraulic control chamber.

Furthermore, to achieve excellent thermal insulation, the central hole of the core is made blind, so as to prevent direct radiation between the friction zone and the column of the cup.

Good results are obtained when the depth of the central hole of the core is between 40% and 80% of the height of the core.

According to another characteristic, the height of the threaded column of the cup is less than the depth of the central hole of the core, so that a cushion of air is provided in a space left for this purpose by the column of the cup in the hole of the core. The cushion of air allows free expansion of the gases which may still remain occluded in the core during heating which can result from particularly sharp braking during operation, and the risk of warping of the core during operation is avoided in this way.

Of course, it is appropriate that the height to which the column is screwed into the hole of the core should be sufficient to allow the core and the cup to be fixed to one another extremely effectively, and good results are obtained when the height of the threaded column of the cup is between 40% and 60% of the depth of the central hole of the core.

According to another characteristic, dishes are made in the free end face of the core and have a depth which is advantageously between 20% and 80% of the height of the core. The effect of these dishes is to reduce the mass of the insulating core, to provide cushions of insulating air at the moment of braking and to increase the surface of the core which is exposed to the air between two successive braking operations.

DETAILED DESCRIPTION OF EMBODIMENTS OF THE INVENTION

Figure 1:
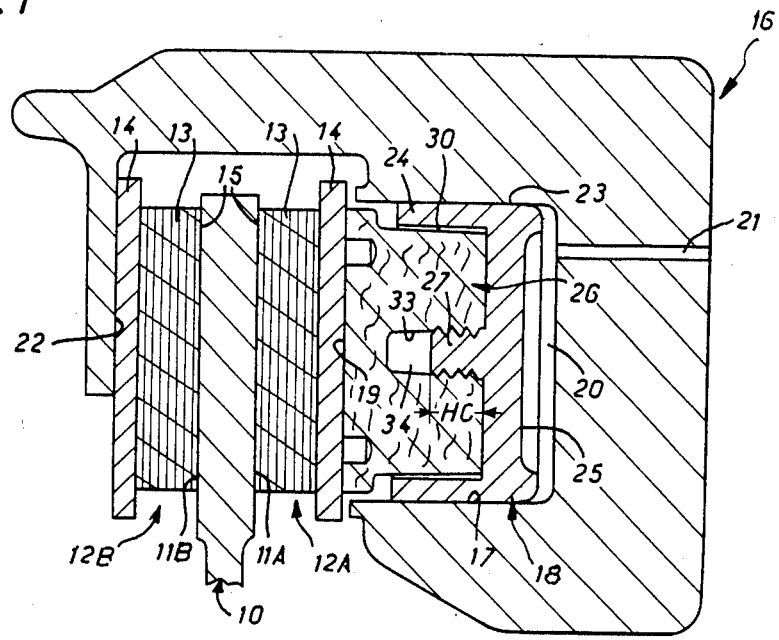
FIG. 1 is a general diagrammatic sectional view of a brake according to the invention, the piston of which comprises a cup which receives a core made of mechanically resistant and thermally insulating material.
Figure 2:
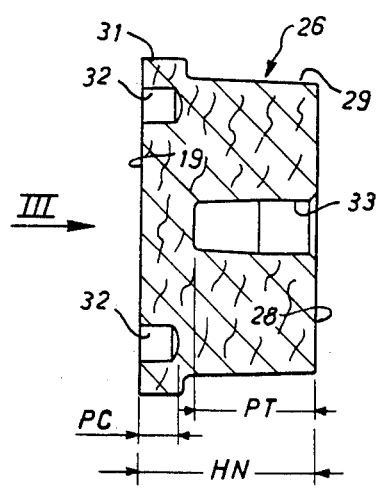
FIG. 2 is a view of the core alone on a larger scale, in a section along the lines II—II of FIG. 3.
Figure 3:
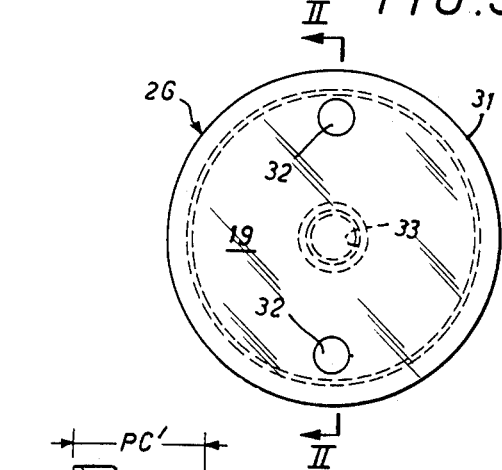
FIG. 3 is an elevation view of the core according to the arrow III of FIG. 2.

Reference will first be made to FIGS. 1 to 3 which relate by way of non-limiting example to a use of the invention for a hydraulically controlled disc brake, especially for a motor vehicle.

FIG. 1 shows at 10 the disc brake which has two opposing rotating tracks 11A and 11B designed to receive frictionally two friction elements 12A and 12B consisting of brake pads. Each pad 12A and 12B is composed of a lining 13 made of frictional material and solid with a support 14. Each pad 12A, 12B is allowed to rub against the corresponding friction track 11A, 11B of the disc 10 by means of the free surface 15 of the lining 13 which is opposite the support 14. Force is transmitted via the support 14 to each pad 12A, 12B to clamp it aganist disc 10, and the brake incorporates a stirrup 16 which caps the disc 10 and in which the pads 12A and 12B are mounted. The stirrup 16 forms the body of a cylinder 17 in which a piston, designated as a whole by 18, is mounted to slide.

The piston 18 has an outer face 19, by means of which it is allowed to push on the support 14 of the pad 12A. The piston 18 defines the cylinder 17 a control chamber 20 which is filled with hydraulic fluid, for example oil. A channel which can be seen at 21 communicates with the chamber 20, and a hydraulic pressure is allowed to be generated in the chamber 20 via this channel.

The stirrup 16 also possesses a reaction face 22, against which bears the support 14 of the other pad 12B.

The pads 12A and 12B are thus designed to be clamped against the rotating tracks 11A and 11B of the disc 10 under the thrust of the piston 18 mounted to slide in the cylinder 17, in response to a generation of pressure in the control chamber 20.

The piston 18 (FIGS. 1 to 3) comprises a cup-shaped piece 23 which has a cylindrical side wall 24 engaged in the cylinder 17 and a bottom 25 adjacent to the control chamber 20. In the example illustrated in FIG. 1, the cup 23 is made of cast steel. Moreover, the piston 18 possesses a cylindrical core 26 made of thermally insulating and mechanically resistant material. The core 26 is accommodated in the cup 23 and projects beyond it. The outer face 19 via which the piston is allowed to push on the pad 12A, is thus formed solely by the free end face 19 of the core 26.

The thermally insulating and mechanically resistant material of which the core 26 is made is a brake friction lining material comprising fibres, fillers and a binder. More particularly, this material comprises, for example, 30% by weight of glass or asbestos fibres, 50% of a mineral filler, such as calcium carbonate, and 20% of binder, such as phenolic resin. These various constituents are first mixed and are then pelletised to the shape of the core 26 and subjected to baking.

For the purpose of fastening the core 26 in the cup 23, the cup 23 has a central threaded column 27 which projects from the bottom 25. This column 27 can be formed in one piece with the bottom 25, as illustrated, or can consist of a separate piece fastened to this bottom 25.

The core 26 has the free end face 19, by means of which the piston 28 is allowed to push on the pad 12A. The core 26 also has another end face 28 which is opposite the free face 19 and which is intended to come in contact with the bottom 25 of the cup 23, as illustrated in FIG. 1. This face 28 can also simply come into the vicinity of the bottom 25, being slightly apart from the latter, so as to provide a cushion of thermally insulating air in the vicinity of this bottom 25.

The two end faces 19 and 28 are substantially plane and parallel.

The side wall 29 of the core 26 is cylindrical or slightly conical, so as to make the moulding conditions easier, as illustrated, and is intended to extend in the vicinity of the side wall 24 of the cup 23, an annular gap 30 being provided between the side walls 24 and 29 to form a cushion of thermally insulating air.

The core 26 has, in the vicinity of its free end face 19, a part 31 of its side wall 29, the diameter of which is enlarged.

Dishes 32 (FIGS. 2 and 3) are made in the free end face 19 of the core 26 and have a depth PC which is between 20% and 80% and, in the example illustrated in FIG. 2, in the neighbourhood of 23% of the height HN of the core 26.

The other end face 28 of the core 26 has blind and smooth central hole 33. The depth PT of the central hole 33 of the core 26 is between 40% and 80%, preferably in the neighbourhood of 70%, of the height HN of the core 26.

The core 26 is fixed to the cup 23 as a result of the engagement of the central hole 33 of the core 26 by screwing on the central threaded column 27 projecting from the bottom 25 of the cup 23. The hole 33 is screwed on the threaded column 27 as a result of tapping the smooth hole 33 in situ. It will be noted that, for the purpose of screwing, the hole 33 can receive a tubular dowel pin made of any suitable material.

The height HC of the threaded column 27 is between 40% and 60%, preferably in the neighbourhood of 57%, of the depth PT of the central hole 33 of the core 26. Thus, after the hole 33 has been screwed on the column 27, a cushion of air 34 is provided at the bottom of the hole 33 (FIG. 1).

The effect of the hole 33 and also of the dishes 32 is to make it possible, at the time when the core 26 is baked, for the occluded gases to expand without risk, thus avoiding warping.

It will also be understood that because of the smooth form of the hole and also of the dishes 32 the core 26 is pelletised under good conditions.

The core 26 is fitted easily into the cup 23 as a result of simple screwing, thus allowing them to be fixed to one another extremely effectively.

The piston 18 formed in this way has very good performance characteristics as regards thermal insulation because of the configuration of the core 26 and also the presence of the cushions 30 and 34. It should be noted that, at the moment of braking, the cushion of air 34 allows the occluded gases to expand without any risk, whilst the dishes 32 make it possible, between two braking operations, to accelerate cooling by ventilating the core 26.

Figure 4:
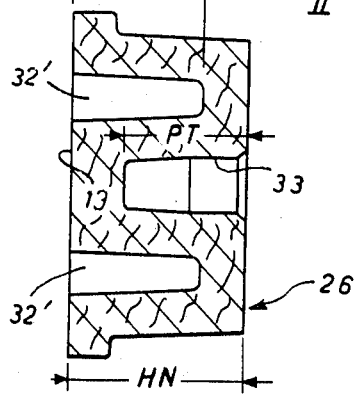
FIG. 4 is a view similar to FIG. 2, but relating to an alternative form.

In an alternative form (FIG. 4), the arrangement is similar to that just described with reference to FIGS. 1 to 3, but the dishes designated by 32′ have a depth PC′ greater than the depth PC in FIG. 2. The depth PC′ is in the neighbourhood of 76% of the height HN of the core 26 in the example illustrated in FIG. 4. The dishes 32″ could likewise be, if not deeper than the dishes 32, more extensive over the face 19, for example in the form of annular grooves. At all events, the core 26 of FIG. 4 is lighter than the core 26 of FIG. 2 and, like the latter, has excellent performance characteristics.

What I claim is:

1. A hydraulic controlled brake comprising at least one friction element adapted to be applied against a braking member, a hydraulic cylinder, a piston slidably mounted in said cylinder for movement in response to pressure, for applying said friction element against the braking member, said piston being of generally cup-shaped configuration and having a cylindrical side wall received in said cylinder, a bottom wall defining a control chamber with said cylinder, a threaded central portion projecting from the bottom wall of said piston into an internal space defined by said cup-shaped piston, and a mechanically resistant cylindrical core of friction lining material received in said internal space and threadedly engaged with said threaded central portion for securing said core on said piston.

2. A brake according to claim 1, wherein said core has a central blind hold in which a thread complementary to that of said threaded central portion is defined.

3. A brake according to claim 2, wherein the depth of said central hole is less than 80% of the axial height of said core.

4. A brake according to claim 3, wherein the depth of said central hole is greater than 40% of the axial height of said core.

5. A brake according to claim 2, wherein the depth of said central hole is greater than 40% of the axial height of said core.

6. A brake according to claim 2, wherein said threaded central portion defines a self-tapping screw thread for tapping a complementary screw thread in said central hole of said core.

7. A brake according to claim 2, wherein said central hole has a tubular plug, a screw thread complementary to that of said central threaded portion being defined in said tubular liner.

8. A brake according to claim 2, wherein said threaded central portion has an axial height less than the depth of said central blind core in said core.

9. A brake according to claim 8, wherein the axial height of the said threaded central portion is less than 60% of the depth of said central hole in said core.

10. A brake according to claim 9, wherein the axial height of said central portion is greater than 40% of the depth of said central hole in said core.

11. A brake according to claim 8, wherein the axial height of said central portion is greater than 40% of the depth of the central hole in said core.

12. A brake according to claim 2, wherein a free end of said core facing away from said bottom wall has at least one hollowed portion.

13. A brake according to claim 12, wherein the depth of said hollowed portion is between 20% and 80% the height of said core.

14. A brake according to claim 1, wherein a permanent annular gap is provided between the side wall of said piston and that of said core.

15. A brake according to claim 14, wherein said core has an enlarged diameter portion adapted to come into contact with said friction element and axially spaced from the free open end of the cup-shaped piston.

16. A brake according to claim 14, wherein a void is defined by a free end of said central portion and a blind end of said blind hole in said core.

17. A brake according to claim 1, wherein said core projects axially beyond the open end of said cup-shaped piston, so that the said piston is adapted to bear against the associated friction element solely by said core.

18. A brake according to claim 1, wherein said core has an enlarged diameter portion adapted to come into contact with said friction element and axially spaced from the free open end of the cup-shaped piston.

19. A brake according to claim 1, wherein said friction material is composed of fibers, filler and a binder.

20. A brake according to claim 1, wherein a void is defined by a free end of said central portion and a blind end of said blind hole in said core.

* * * * *